Oct. 9, 1956   H. F. RONDEAU ET AL   2,765,658
GAS METER CASING
Filed July 23, 1953   3 Sheets-Sheet 1

INVENTORS
Herbert J. Rondeau
Ernest H. Dahlberg
BY
Ralph Hammar
ATTORNEY

Oct. 9, 1956 H. F. RONDEAU ET AL 2,765,658
GAS METER CASING
Filed July 23, 1953 3 Sheets-Sheet 2

INVENTORS
Herbert J. Rondeau
Ernest H. Dahlberg
BY Ralph Hammar
ATTORNEY

Oct. 9, 1956 H. F. RONDEAU ET AL 2,765,658
GAS METER CASING
Filed July 23, 1953 3 Sheets-Sheet 3

INVENTORS
Herbert J. Rondeau
Ernest H. Dahlberg
BY
Ralph Hammar
ATTORNEY

United States Patent Office 2,765,658
Patented Oct. 9, 1956

2,765,658
GAS METER CASING

Herbert F. Rondeau, Harborcreek, and Ernest H. Dahlberg, Erie, Pa., assignors to American Meter Company, Incorporated, Erie, Pa., a corporation of Delaware Application July 23, 1953, Serial No. 369,902

3 Claims. (Cl. 73—274)

This invention is intended to simplify gas meter construction, installation, and service. The meter case is made in three sections, a center section, which serves as a frame carrying the operating parts including the gas distributing valves sandwiched between a cover which serves as a gas distributing chamber, and a lower section which houses the meter bellows or measuring chambers. Fasteners extending from the cover through the center section into the lower section pull both the cover and the lower section into sealing engagement with the center section. In a preferred form, the fasteners are screws extending through brackets at the lower ends of gas pipe fittings so that the screws have the additional function of fastening the pipe fittings to the cover section. Another advantage of the fastening arrangement is that the screws are accessible only through the gas pipe fittings so that after the meter is connected to the gas lines the case is protected from tampering.

Figure 1:
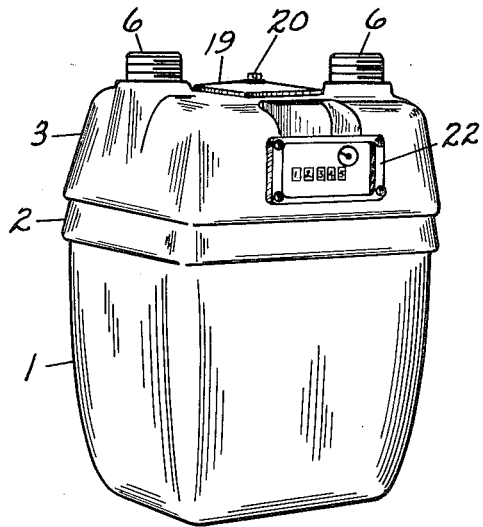
Figure 2:
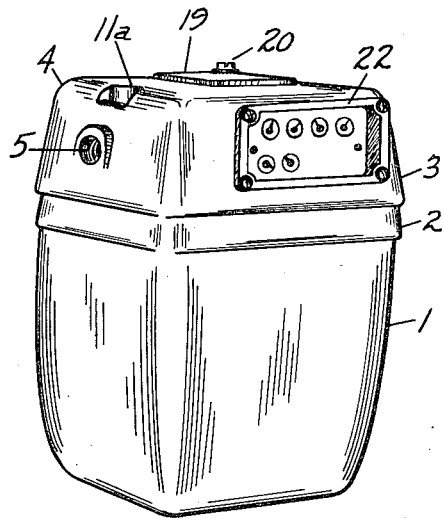
Figure 4:
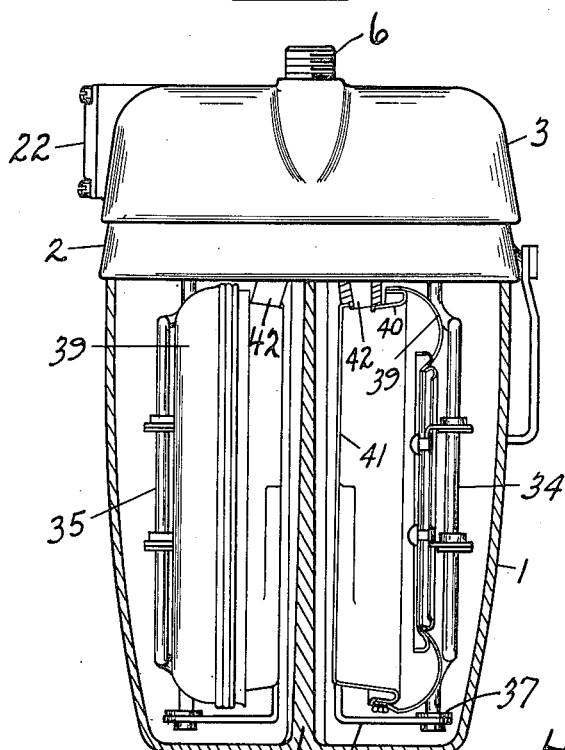
Figure 3:
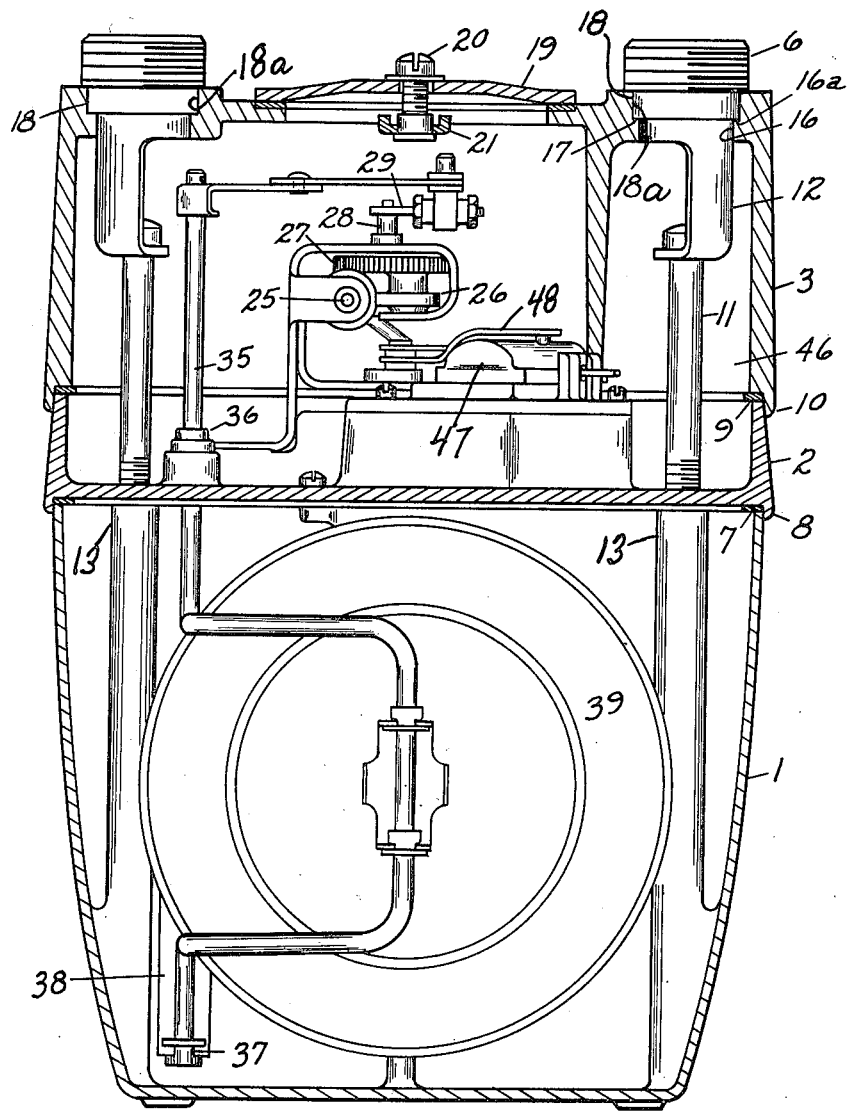
Figure 6:
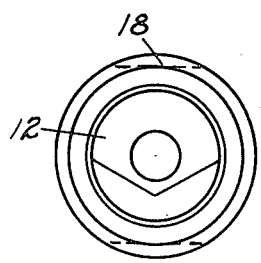
Figure 5:
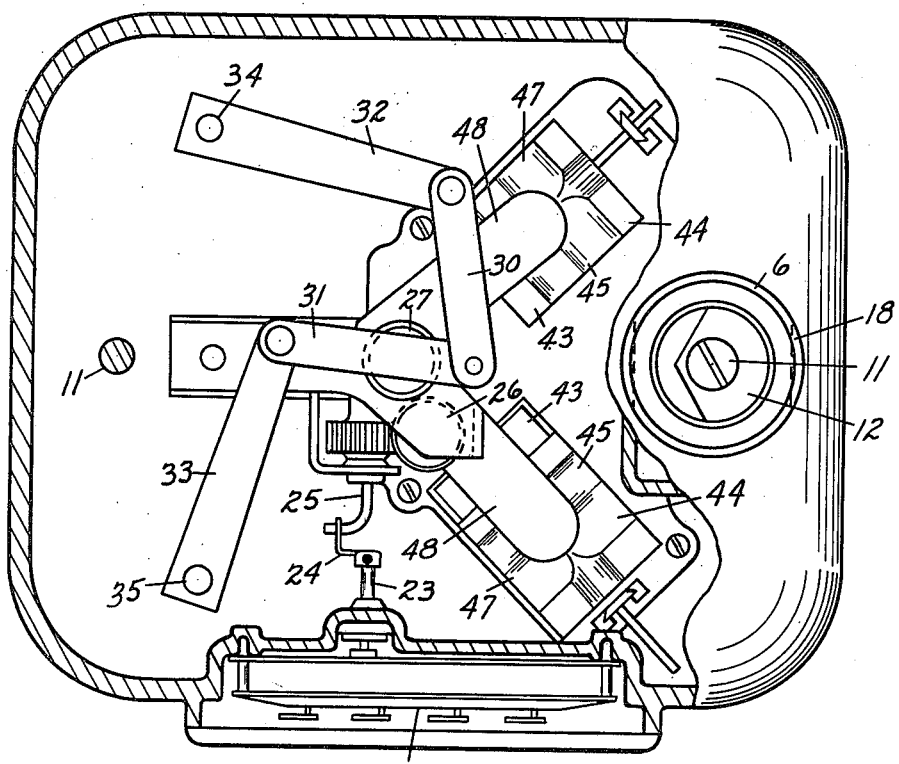
Figure 7:
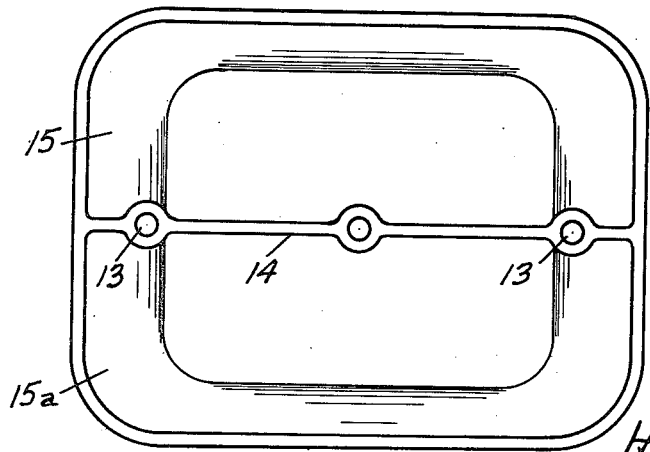

In the accompanying drawing, Fig. 1 is a perspective of a top connected gas meter; Fig. 2 is a perspective of a side connected gas meter; Fig. 3 is a sectional front elevation of the Fig. 1 meter; Fig. 4 is a side view of the Fig. 1 meter partly broken away; Fig. 5 is a top view of the Fig. 1 meter partly broken away; Fig. 6 is a top view of one of the gas pipe fittings used in the Fig. 1 meter; and Fig. 7 is a top view of the lower casing section used in both of the Fig. 1 and Fig. 2 gas meters.

The gas meter shown in Fig. 1 has an outer casing comprising three sections, a lower section 1, an intermediate section 2, and a top or cover section 3. The meter shown in Fig. 2 has the same lower and intermediate sections, but the top or cover section 4 is tapped at opposite sides at 5 for side connections to the gas piping, whereas the cover 3 for the Fig. 1 meter has top fittings 6 for connection to the gas piping. Except for the differences in the covers 3 and 4, the Fig. 1 and 2 meters are the same. The differences are primarily related to the manner of making the connections to the gas pipe lines.

As shown in Fig. 3, the intermediate casing section 2 is seated on a gasket 7 on the upper peripheral edge of the lower casing section 1 and has a lip 8 depending below the upper edge of the lower casing section to provide a water shed. Similarly, the cover 3 is seated on a gasket 9 on the upper peripheral edge of the intermediate casing section 2 and has a depending lip 10 providing a water shed. The three casing sections are secured together by screws 11 extending through brackets 12 and threaded into bosses 13 in a web 14 which divides the lower casing section 1 into two bellows compartments 15 and 15a. The brackets 12 are integral with the gas pipe fittings 6 and depend through openings 16 in the cover so that the brackets are entirely housed within the cover. The fittings 6 have shoulders 16a seated on surfaces 17 around the openings 16 so that when the screws 11 are tightened, the shoulders 16a on the fittings 6 are pulled into sealing engagement with the surfaces 17, the cover 3 is pulled into sealing engagement with the upper peripheral edge of the intermediate casing section 2, and the intermediate casing section 2 is pulled into sealing engagement with the upper peripheral edge of the lower casing section 1. The two screws 11 accordingly fasten the three casing sections together to complete the assembly of the gas meter casing and also secure the fittings 6 to the cover. This construction makes it very simple to change the size of the gas pipe fittings to fit any existing gas pipes. By loosening the screws 11, the fittings 6 can be removed and new fittings dropped in place. It will be noted in Figs. 3 and 6 that the fittings have non-circular portions provided by flats 18 which engage complementary non-circular portions 18a in the openings 16 and prevent rotation of the fittings relative to the cover. When the screws 11 are retightened, the fittings are securely anchored to the cover being drawn into sealing engagement with the surfaces 17 and are non-rotatably anchored in the cover by the flats 18.

An important feature of this construction is that the screws 11 are entirely enclosed within the cover. When the meter is disconnected from the piping, the screws 11 are accessible through the gas pipe fittings 6. However, as soon as the meter is connected to the piping, the screws 11 are entirely enclosed and not accessible to tampering so that no sealing wires are needed for the meter casing.

In the side piped gas meter shown in Fig. 2, there are two screws 11a which extend from the top or cover 4 through the intermediate casing section 2 into the lower casing section 1 and clamp the three casing sections together in the same manner as the screws 11, but the screws 11a are accessible to tampering and accordingly must be sealed. With the side connected meter shown in Fig. 2, it is not necessary to disconnect the meter from the gas piping in order to disassemble the meter casing for service. When the screws 11a are loosened, the intermediate and lower casing sections 1 and 2 can be removed and since these contain all of the operating parts of the meter except the register, the meter can be serviced and repaired, or the removed parts can be replaced with other parts which have been repaired. In the top connected meter, it is necessary to disconnect the meter from the gas piping for service and repair.

In both the side and top piped meters, access to the mechanism may be had through a hand hole cover 19 urged into sealing engagement with the top of the cover 3 or 4, as the case may be, by a screw 20 threaded into a clamp bar 21 of greater length than the width of the opening covered by the hand hole cover 19. By tightening the screw 20, the clamp bar 21 is brought up against the underside of the cover 3 or 4 and the hand hole cover 19 is pulled down into sealing engagement.

The operating parts of the gas meter are all carried on the intermediate casing section 2. The lower casing section 1 carries none of the operating parts. The cover 3 or 4 carries the register 22 having a shaft 23 driven by a coupling 24 from the meter countershaft 25. All of the remaining operating parts of the gas meter are mounted on the intermediate casing section 2 and are or may be of conventional construction.

Since the operating mechanism for the gas meter is well understood and may vary substantially from the construction illustrated, it will be sufficient for the purpose of the present application to identify the common elements. The countershaft 25 is driven through an idler gear 26 by a gear 27 on a crankshaft 28. A tangent arm 29 fixed to the crankshaft is connected through arms 30 and 31 to flag arms 32 and 33 fixed to the upper ends of flag rods 34 and 35. The flag rods are journaled in bearings 36 in the intermediate casing member 2 and in bearings 37 at the lower end in brackets 38, if necessary. The flag rods are connected to diaphragms 39 fixed to the rims 40 of pans 41 depending from ports 42 on the underside of the intermediate casing section 2. As the flag rods oscillate toward and away from the pans 41, the gas is alternately drawn in from the intake chamber between the cover 3 or 4 and the upper side of the intermediate casing section 2 into intake ports 43 and 44 and is discharged through outlet ports 45 to the outlet chamber 46. The inlet ports 43 are connected through ways 42 to the interior of the pans 41, while the inlet ports 44 are connected to the space between the lower casing section 1 and the outside of the diaphragms 39. As the flag rods reciprocate, measured quantities of gas are taken in through the inlet ports 43, 44 and discharged through the outlet ports 45 to the discharge chamber 46. The reciprocation of the flag rods 34 and 35 acts through the arms 30—33 and the tangent arm 29 to rotate the crankshaft 28 and accordingly drive the register shaft 23 through the gear train 27, 26. The rotation of the crankshaft also reciprocates slide valve members 47 through arms 48 to control the sequence of admission of gas through the ports 43 and 44.

What is claimed as new is:

1. In a gas meter, a gas-tight casing having walls forming measuring chambers and a gas distributing chamber for enclosing valves controlling the flow of gas into and out of the measuring chambers, the wall forming part of said distributing chamber having openings therein for gas inlet and gas outlet pipe fittings, one of the openings having a sealing surface around it, a gas pipe fitting having a tubular body for connection to a pipe, a bracket depending through said one opening and a shoulder of larger diameter than the opening seated on said surface around the opening, and a screw in the bracket accessible through the pipe fitting and threaded into an internal part of the casing for pulling said shoulder into sealing engagement with said surface and fastening the pipe fitting to said casing.

2. In a gas meter, a gas tight casing having walls forming measuring chambers and a gas distributing chamber for enclosing valves controlling the flow of gas into and out of the measuring chambers, the wall forming part of said distributing chamber having openings therein for gas inlet and gas outlet pipe fittings, one of the openings having a sealing surface around it, a gas pipe fitting having a tubular body for connection to a pipe, a shoulder around the body seated on said surface around said one opening and a bracket integral with the body depending through the opening, and a screw in the bracket accessible through the pipe fitting and threaded into an internal part of the casing for pulling said shoulder into sealing engagement with said surface and fastening the pipe fitting to said casing.

3. In a gas meter, an upper casing section closed at its upper end, an intermediate section, a lower casing section closed at its lower end, said casing sections when assembled forming a sealed casing having walls which form measuring chambers and a gas distributing chamber for enclosing valves controlling the flow of gas from inlet piping into the measuring chambers and out of the measuring chambers to outlet piping, said upper casing section having vertical inlet and outlet openings, a tubular fitting in each of said inlet and outlet openings, and having a bracket depending through said openings, fastening means beneath said openings extending from the brackets through the intermediate section into an internal part of the lower casing section for securing the casing sections together whereby the fastening means are accessible through the bore of the fittings and are protected from tampering when the fittings are connected to a gas line.

References Cited in the file of this patent

UNITED STATES PATENTS

| | | |
|---|---|---|
| 430,431 | Milsted | June 17, 1890 |
| 536,769 | Vinter | Apr. 2, 1895 |
| 2,544,665 | Gilmore | Mar. 13, 1951 |

FOREIGN PATENTS

| | | |
|---|---|---|
| 755,209 | France | Sept. 4, 1933 |
| 577,442 | Great Britain | May 17, 1946 |
| 681,135 | Great Britain | Oct. 15, 1952 |